US011079874B2

(12) United States Patent
Lapointe et al.

(10) Patent No.: US 11,079,874 B2
(45) Date of Patent: Aug. 3, 2021

(54) VIRTUAL BUTTON CHARACTERIZATION ENGINE

(71) Applicant: Cirrus Logic International Semiconductor Ltd., Edinburgh (GB)

(72) Inventors: Luke Lapointe, Austin, TX (US); Tejasvi Das, Austin, TX (US); Siddharth Maru, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/867,223

(22) Filed: May 5, 2020

(65) Prior Publication Data
US 2021/0149538 A1    May 20, 2021

Related U.S. Application Data

(60) Provisional application No. 62/937,555, filed on Nov. 19, 2019.

(51) Int. Cl.
*G06F 3/041*  (2006.01)
*G06F 21/50*  (2013.01)
*G06F 3/0488* (2013.01)
*H03K 17/96*  (2006.01)

(52) U.S. Cl.
CPC ........ *G06F 3/04144* (2019.05); *G06F 3/0414* (2013.01); *G06F 3/0418* (2013.01); *G06F 3/0488* (2013.01); *G06F 21/50* (2013.01); *H03K 17/962* (2013.01); *H03K 17/9645* (2013.01); *G06F 2203/04105* (2013.01); *G06F 2221/2133* (2013.01)

(58) Field of Classification Search
CPC .............................. G06F 3/041–048
See application file for complete search history.

(56) References Cited

U.S. PATENT DOCUMENTS

| 4,888,554 A | 12/1989 | Hyde et al. |
| 5,286,941 A | 2/1994 | Bel |
| 5,898,136 A | 4/1999 | Katsurahira |
| 6,231,520 B1 | 5/2001 | Maezawa |
| 6,380,923 B1 | 4/2002 | Fukumoto et al. |
| 7,173,410 B1 | 2/2007 | Pond |

(Continued)

FOREIGN PATENT DOCUMENTS

| DE | 4004450 A1 | 8/1991 |
| DE | 102015215330 A1 | 2/2017 |

(Continued)

OTHER PUBLICATIONS

Combined Search and Examination Report under Sections 17 and 18(3), UKIPO, Application No. GB2001341.3, dated Jun. 29, 2020.

(Continued)

*Primary Examiner* — Patrick F Marinelli
(74) *Attorney, Agent, or Firm* — Jackson Walker L.L.P.

(57) ABSTRACT

A method may include receiving an input signal from a force sensor configured to sense a force associated with a human interaction with a virtual button, comparing the input signal to at least one behavioral model, the at least one behavioral model comprising one or more parameters associated with a valid human interaction with the virtual button, and determining whether a valid human interaction with the virtual button occurred based on the comparing.

30 Claims, 8 Drawing Sheets

(56) References Cited

U.S. PATENT DOCUMENTS

| | | | |
|---|---|---|---|
| 8,384,378 B2 | 2/2013 | Feldkamp et al. | |
| 8,421,446 B2 | 4/2013 | Straubinger et al. | |
| 9,707,502 B1 | 7/2017 | Bonifas et al. | |
| 10,168,855 B2* | 1/2019 | Baughman | G06F 3/04883 |
| 10,372,328 B2* | 8/2019 | Zhai | G06F 3/04186 |
| 10,642,435 B2 | 5/2020 | Maru et al. | |
| 10,725,549 B2 | 7/2020 | Marijanovic et al. | |
| 10,726,715 B2* | 7/2020 | Hwang | G06F 3/0487 |
| 2001/0045941 A1 | 11/2001 | Rosenberg et al. | |
| 2003/0038624 A1 | 2/2003 | Hilliard et al. | |
| 2005/0192727 A1 | 9/2005 | Shostak et al. | |
| 2005/0258826 A1 | 11/2005 | Kano et al. | |
| 2005/0283330 A1 | 12/2005 | Laraia et al. | |
| 2006/0025897 A1 | 2/2006 | Shostak et al. | |
| 2007/0198926 A1 | 8/2007 | Joguet et al. | |
| 2008/0150905 A1 | 6/2008 | Grivna et al. | |
| 2008/0167832 A1 | 7/2008 | Soss | |
| 2008/0312857 A1 | 12/2008 | Sequine | |
| 2009/0009195 A1 | 1/2009 | Seguine | |
| 2009/0058430 A1 | 3/2009 | Zhu | |
| 2009/0140728 A1 | 6/2009 | Rollins et al. | |
| 2009/0278685 A1 | 11/2009 | Potyrailo et al. | |
| 2009/0302868 A1 | 12/2009 | Feucht et al. | |
| 2010/0045360 A1 | 2/2010 | Howard et al. | |
| 2010/0153845 A1 | 6/2010 | Gregorio et al. | |
| 2010/0211902 A1 | 8/2010 | Unsworth et al. | |
| 2010/0231239 A1 | 9/2010 | Tateishi et al. | |
| 2010/0238121 A1 | 9/2010 | Ely | |
| 2010/0328249 A1 | 12/2010 | Ningrat et al. | |
| 2011/0005090 A1 | 1/2011 | Lee et al. | |
| 2011/0216311 A1 | 9/2011 | Kachanov et al. | |
| 2011/0267302 A1 | 11/2011 | Fasshauer | |
| 2011/0291821 A1 | 12/2011 | Chung | |
| 2011/0301876 A1 | 12/2011 | Yamashita | |
| 2013/0018489 A1 | 1/2013 | Grunthaner et al. | |
| 2013/0076374 A1 | 3/2013 | Huang | |
| 2013/0106756 A1 | 5/2013 | Kono et al. | |
| 2013/0106769 A1 | 5/2013 | Bakken et al. | |
| 2013/0141382 A1 | 6/2013 | Simmons et al. | |
| 2013/0269446 A1 | 10/2013 | Fukushima et al. | |
| 2014/0002113 A1 | 1/2014 | Schediwy et al. | |
| 2014/0028327 A1 | 1/2014 | Potyrailo et al. | |
| 2014/0225599 A1 | 8/2014 | Hess | |
| 2014/0267065 A1 | 9/2014 | Levesque | |
| 2015/0022174 A1 | 1/2015 | Nikitin | |
| 2015/0077094 A1 | 3/2015 | Baldwin et al. | |
| 2015/0084874 A1 | 3/2015 | Cheng et al. | |
| 2015/0293695 A1* | 10/2015 | Schonleben | G06F 3/0412 345/173 |
| 2015/0329199 A1 | 11/2015 | Golborne et al. | |
| 2016/0018940 A1 | 1/2016 | Lo et al. | |
| 2016/0048256 A1 | 2/2016 | Day | |
| 2016/0117084 A1 | 4/2016 | Ording | |
| 2016/0162031 A1 | 6/2016 | Westerman et al. | |
| 2016/0179243 A1 | 6/2016 | Schwartz | |
| 2016/0231874 A1* | 8/2016 | Baughman | G06F 3/0487 |
| 2016/0252403 A1 | 9/2016 | Murakami | |
| 2016/0305997 A1 | 10/2016 | Wiesbauer et al. | |
| 2016/0357296 A1 | 12/2016 | Picciiotto et al. | |
| 2017/0023429 A1 | 1/2017 | Straeussnigg et al. | |
| 2017/0077735 A1 | 3/2017 | Leabman | |
| 2017/0093222 A1 | 3/2017 | Joye et al. | |
| 2017/0140644 A1* | 5/2017 | Hwang | G06F 3/0487 |
| 2017/0147068 A1 | 5/2017 | Yamazaki et al. | |
| 2017/0168578 A1 | 6/2017 | Tsukamoto et al. | |
| 2017/0185173 A1 | 6/2017 | Ito et al. | |
| 2017/0187541 A1 | 6/2017 | Sundaresan et al. | |
| 2017/0237293 A1 | 8/2017 | Faraone et al. | |
| 2017/0282715 A1 | 10/2017 | Fung et al. | |
| 2017/0328740 A1 | 11/2017 | Widmer et al. | |
| 2017/0371380 A1 | 12/2017 | Oberhauser et al. | |
| 2017/0371381 A1 | 12/2017 | Liu | |
| 2017/0371473 A1 | 12/2017 | David et al. | |
| 2018/0019722 A1 | 1/2018 | Birkbeck | |
| 2018/0055448 A1 | 3/2018 | Karakaya et al. | |
| 2018/0059793 A1 | 3/2018 | Hajati | |
| 2018/0074637 A1 | 3/2018 | Rosenberg et al. | |
| 2018/0088064 A1 | 3/2018 | Potyrailo et al. | |
| 2018/0135409 A1 | 5/2018 | Wilson et al. | |
| 2018/0182212 A1 | 6/2018 | Li et al. | |
| 2018/0183372 A1 | 6/2018 | Li et al. | |
| 2018/0195881 A1 | 7/2018 | Acker | |
| 2018/0221796 A1 | 8/2018 | Bonifas et al. | |
| 2018/0229161 A1 | 8/2018 | Maki et al. | |
| 2018/0231485 A1 | 8/2018 | Potyrailo et al. | |
| 2018/0260049 A1 | 9/2018 | O'Lionaird et al. | |
| 2018/0260050 A1 | 9/2018 | Unseld et al. | |
| 2018/0321748 A1* | 11/2018 | Rao | G06F 3/0416 |
| 2019/0179146 A1 | 6/2019 | De Nardi | |
| 2019/0197218 A1* | 6/2019 | Schwartz | G06K 9/0002 |
| 2019/0204929 A1* | 7/2019 | Attari | H04M 1/0281 |
| 2019/0235629 A1 | 8/2019 | Hu et al. | |
| 2019/0302161 A1 | 10/2019 | You et al. | |
| 2019/0302193 A1 | 10/2019 | Maru et al. | |
| 2019/0302890 A1 | 10/2019 | Marijanovic et al. | |
| 2019/0302922 A1 | 10/2019 | Das et al. | |
| 2019/0302923 A1 | 10/2019 | Maru et al. | |
| 2019/0339313 A1 | 11/2019 | Vandermeijden | |
| 2019/0377468 A1* | 12/2019 | Micci | G06F 3/0418 |
| 2020/0064160 A1 | 2/2020 | Maru et al. | |
| 2020/0133455 A1* | 4/2020 | Sepehr | G06F 3/0414 |
| 2020/0177290 A1 | 6/2020 | Reimer et al. | |
| 2020/0191761 A1 | 6/2020 | Potyrailo et al. | |
| 2020/0271477 A1 | 8/2020 | Kost et al. | |
| 2020/0271706 A1 | 8/2020 | Wardlaw et al. | |
| 2020/0271745 A1 | 8/2020 | Das et al. | |
| 2020/0272301 A1 | 8/2020 | Duewer et al. | |
| 2020/0319237 A1 | 10/2020 | Maru et al. | |

FOREIGN PATENT DOCUMENTS

| | | |
|---|---|---|
| DE | 102015215331 A1 | 2/2017 |
| EP | 1697710 B1 | 4/2007 |
| EP | 2682843 A1 | 1/2014 |
| GB | 2573644 A | 11/2019 |
| JP | 2006246289 A | 9/2006 |
| WO | 00/33244 A2 | 6/2000 |
| WO | 20061354832 A2 | 12/2006 |
| WO | 2007068283 A1 | 6/2007 |
| WO | 2016032704 A1 | 3/2016 |

OTHER PUBLICATIONS

International Search Report and Written Opinion of the International Searching Authority, International Application No. PCT/US2019/045554, dated Oct. 17, 2019.

Combined Search and Examination Report, UKIPO, Application No. GB1904250.6, dated Sep. 10, 2019.

International Search Report and Written Opinion of the International Searching Authority, International Application No. PCT/US2019/022518, dated May 24, 2019.

International Search Report and Written Opinion of the International Searching Authority, International Application No. PCT/US2019/022578, dated May 27, 2019.

International Search Report and Written Opinion of the International Searching Authority, International Application No. PCT/US2019/021838, dated May 27, 2019.

International Search Report and Written Opinion of the International Searching Authority, International Application No. PCT/US2020/059113, dated Feb. 23, 2021.

International Search Report and Written Opinion of the International Searching Authority, International Application No. PCT/US2020/059101, dated Mar. 9, 2021.

* cited by examiner

VIRTUAL BUTTON CHARACTERIZATION ENGINE

RELATED APPLICATIONS

The present disclosure claims priority to U.S. Provisional Patent Application Ser. No. 62/937,555, filed Nov. 19, 2019, which is incorporated by reference herein in its entirety. The present disclosure also relates to U.S. patent application Ser. No. 16/267,079, filed Feb. 4, 2019, and U.S. patent application Ser. No. 16/422,543, filed May 24, 2019, both of which are incorporated by reference herein in their entireties.

FIELD OF DISCLOSURE

The present disclosure relates in general to electronic devices with user interfaces, (e.g., mobile devices, game controllers, instrument panels, etc.), and more particularly, an integrated haptic system for use in a system for mechanical button replacement in a mobile device, for use in haptic feedback for capacitive sensors, and/or other suitable applications.

BACKGROUND

Many traditional mobile devices (e.g., mobile phones, personal digital assistants, video game controllers, etc.) include mechanical buttons to allow for interaction between a user of a mobile device and the mobile device itself. However, such mechanical buttons are susceptible to aging, wear, and tear that may reduce the useful life of a mobile device and/or may require significant repair if malfunction occurs. Also, the presence of mechanical buttons may render it difficult to manufacture mobile devices to be waterproof. Accordingly, mobile device manufacturers are increasingly looking to equip mobile devices with virtual buttons that act as a human-machine interface allowing for interaction between a user of a mobile device and the mobile device itself. Similarly, mobile device manufacturers are increasingly looking to equip mobile devices with other virtual interface areas (e.g., a virtual slider, interface areas of a body of the mobile device other than a touch screen, etc.). Ideally, for best user experience, such virtual interface areas should look and feel to a user as if a mechanical button or other mechanical interface were present instead of a virtual button or virtual interface area.

Presently, linear resonant actuators (LRAs) and other vibrational actuators (e.g., rotational actuators, vibrating motors, etc.) are increasingly being used in mobile devices to generate vibrational feedback in response to user interaction with human-machine interfaces of such devices. Typically, a sensor (traditionally a force or pressure sensor) detects user interaction with the device (e.g., a finger press on a virtual button of the device) and in response thereto, the linear resonant actuator may vibrate to provide feedback to the user. For example, a linear resonant actuator may vibrate in response to user interaction with the human-machine interface to mimic to the user the feel of a mechanical button click.

However, there is a need in the industry for sensors to detect user interaction with a human-machine interface, wherein such sensors provide acceptable levels of sensor sensitivity, power consumption, and size. For example, one challenge in the implementation of a virtual button is the accurate discrimination between actual user interaction with the virtual button and anomalous sensor inputs such as those caused by force sensor drift and/or device bending.

SUMMARY

In accordance with the teachings of the present disclosure, the disadvantages and problems associated with use of a virtual button in a mobile device may be reduced or eliminated.

In accordance with embodiments of the present disclosure, a method may include receiving an input signal from a force sensor configured to sense a force associated with a human interaction with a virtual button, comparing the input signal to at least one behavioral model, the at least one behavioral model comprising one or more parameters associated with a valid human interaction with the virtual button, and determining whether a valid human interaction with the virtual button occurred based on the comparing.

In accordance with these and other embodiments of the present disclosure, a system may include an input for receiving an input signal from a force sensor configured to sense a force associated with a human interaction with a virtual button and a button characterization engine configured to compare the input signal to at least one behavioral model, the at least one behavioral model comprising one or more parameters associated with a valid human interaction with the virtual button and determine whether a valid human interaction with the virtual button occurred based on the comparing.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
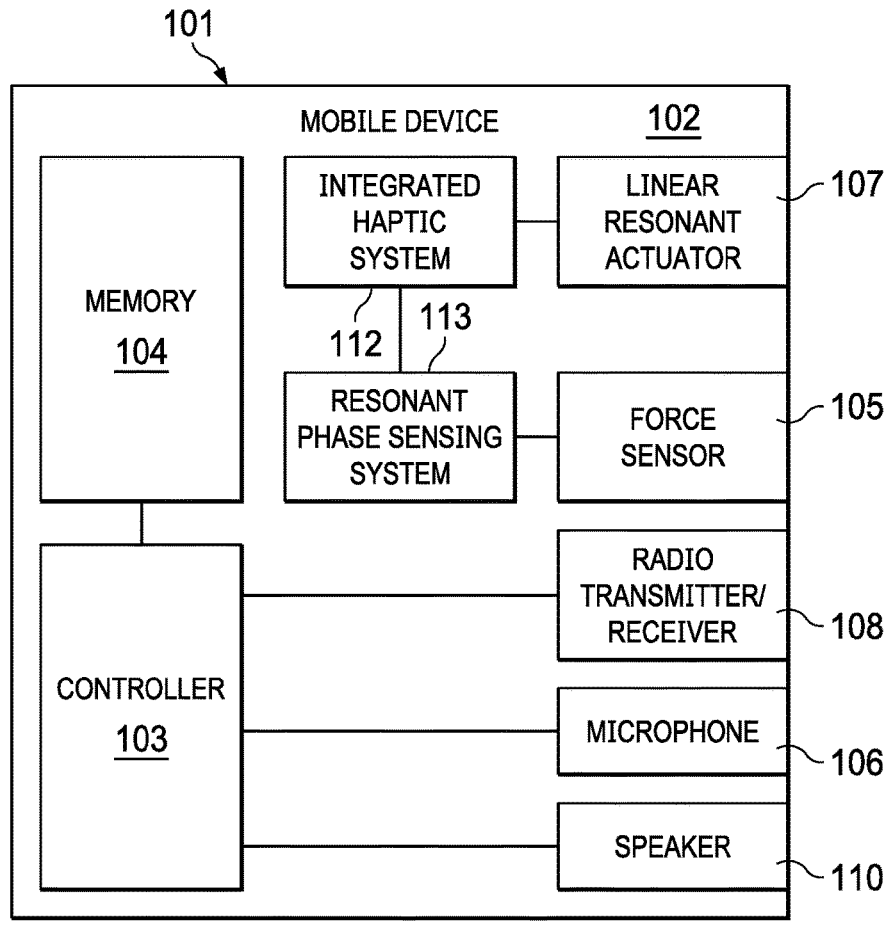
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a force sensor 105, a microphone 106, a linear resonant actuator 107, a radio transmitter/receiver 108, a speaker 110, an integrated haptic system 112, and a resonant phase sensing system 113.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Force sensor 105 may be housed within enclosure 101, and may include any suitable system, device, or apparatus for sensing a force, a pressure, or a touch (e.g., an interaction with a human finger) and generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general purpose input/output signal (GPIO) associated with an input signal to which haptic feedback is given. Force sensor 105 may include, without limitation, a capacitive displacement sensor, an inductive force sensor (e.g., a resistive-inductive-capacitive sensor), a strain gauge, a piezoelectric force sensor, force sensing resistor, piezoelectric force sensor, thin film force sensor, or a quantum tunneling composite-based force sensor. For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from integrated haptic system 112, may render haptic feedback to a user of mobile device 102 for at least one of mechanical button replacement and capacitive sensor feedback.

Integrated haptic system 112 may be housed within enclosure 101, may be communicatively coupled to force sensor 105 and linear resonant actuator 107, and may include any system, device, or apparatus configured to receive a signal from force sensor 105 indicative of a force applied to mobile device 102 (e.g., a force applied by a human finger to a virtual button of mobile device 102) and generate an electronic signal for driving linear resonant actuator 107 in response to the force applied to mobile device 102. Detail of an example integrated haptic system in accordance with embodiments of the present disclosure is depicted in FIG. 2.

Resonant phase sensing system 113 may be housed within enclosure 101, may be communicatively coupled to force sensor 105 and linear resonant actuator 107, and may include any system, device, or apparatus configured to detect a displacement of a mechanical member (e.g., mechanical member 305 depicted in FIGS. 3A and 3B, below) indicative of a physical interaction (e.g., by a user of mobile device 102) with the human-machine interface of mobile device 102 (e.g., a force applied by a human finger to a virtual interface of mobile device 102). As described in greater detail below, resonant phase sensing system 113 may detect displacement of such mechanical member by performing resonant phase sensing of a resistive-inductive-capacitive sensor for which an impedance (e.g., inductance, capacitance, and/or resistance) of the resistive-inductive-capacitive sensor changes in response to displacement of the mechanical member. Thus, displacement of the mechanical member may cause a change in an impedance of a resistive-inductive-capacitive sensor integral to resonant phase sense system 113. Resonant phase sensing system 113 may also generate an electronic signal to integrated haptic system 112 to which integrated haptic system 112 may respond by driving linear resonant actuator 107 in response to a physical interaction associated with a human-machine interface associated with the mechanical member. Detail of an example resonant phase sensing system 113 in accordance with embodiments of the present disclosure is depicted in greater detail below.

Although specific example components are depicted above in FIG. 1 as being integral to mobile device 102 (e.g., controller 103, memory 104, force sensor 105, microphone 105, radio transmitter/receiver 108, speakers(s) 110), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1 (including but not limited to a keypad, a touch screen, and a display), thus allowing a user to interact with and/or otherwise manipulate mobile device 102 and its associated components.

Figure 2:
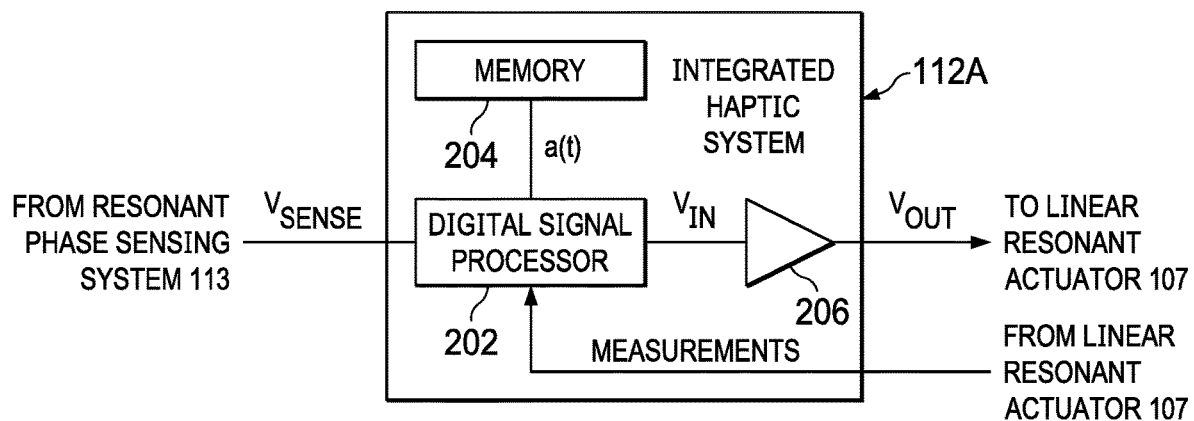
FIG. 2 illustrates a block diagram of selected components of an example integrated haptic system, in accordance with embodiments of the present disclosure.

FIG. 2 illustrates a block diagram of selected components of an example integrated haptic system 112A, in accordance with embodiments of the present disclosure. In some embodiments, integrated haptic system 112A may be used to implement integrated haptic system 112 of FIG. 1. As shown in FIG. 2, integrated haptic system 112A may include a digital signal processor (DSP) 202, a memory 204, and an amplifier 206.

DSP 202 may include any system, device, or apparatus configured to interpret and/or execute program instructions and/or process data. In some embodiments, DSP 202 may interpret and/or execute program instructions and/or process data stored in memory 204 and/or other computer-readable media accessible to DSP 202.

Memory 204 may be communicatively coupled to DSP 202, and may include any system, device, or apparatus configured to retain program instructions and/or data for a period of time (e.g., computer-readable media). Memory 204 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Amplifier 206 may be electrically coupled to DSP 202 and may comprise any suitable electronic system, device, or apparatus configured to increase the power of an input signal $V_{IN}$ (e.g., a time-varying voltage or current) to generate an output signal $V_{OUT}$. For example, amplifier 206 may use electric power from a power supply (not explicitly shown) to increase the amplitude of a signal. Amplifier 206 may include any suitable amplifier class, including without limitation, a Class-D amplifier.

In operation, memory 204 may store one or more haptic playback waveforms. In some embodiments, each of the one or more haptic playback waveforms may define a haptic response a(t) as a desired acceleration of a linear resonant actuator (e.g., linear resonant actuator 107) as a function of time. DSP 202 may be configured to receive a force signal $V_{SENSE}$ from resonant phase sensing system 113 indicative of force applied to force sensor 105. Either in response to receipt of force signal $V_{SENSE}$ indicating a sensed force or independently of such receipt, DSP 202 may retrieve a haptic playback waveform from memory 204 and process such haptic playback waveform to determine a processed haptic playback signal $V_{IN}$. In embodiments in which amplifier 206 is a Class D amplifier, processed haptic playback signal $V_{IN}$ may comprise a pulse-width modulated signal. In response to receipt of force signal $V_{SENSE}$ indicating a sensed force, DSP 202 may cause processed haptic playback signal $V_{IN}$ to be output to amplifier 206, and amplifier 206 may amplify processed haptic playback signal $V_{IN}$ to generate a haptic output signal $V_{OUT}$ for driving linear resonant actuator 107.

In some embodiments, integrated haptic system 112A may be formed on a single integrated circuit, thus enabling lower latency than existing approaches to haptic feedback control. By providing integrated haptic system 112A as part of a single monolithic integrated circuit, latencies between various interfaces and system components of integrated haptic system 112A may be reduced or eliminated.

Figure 3A:
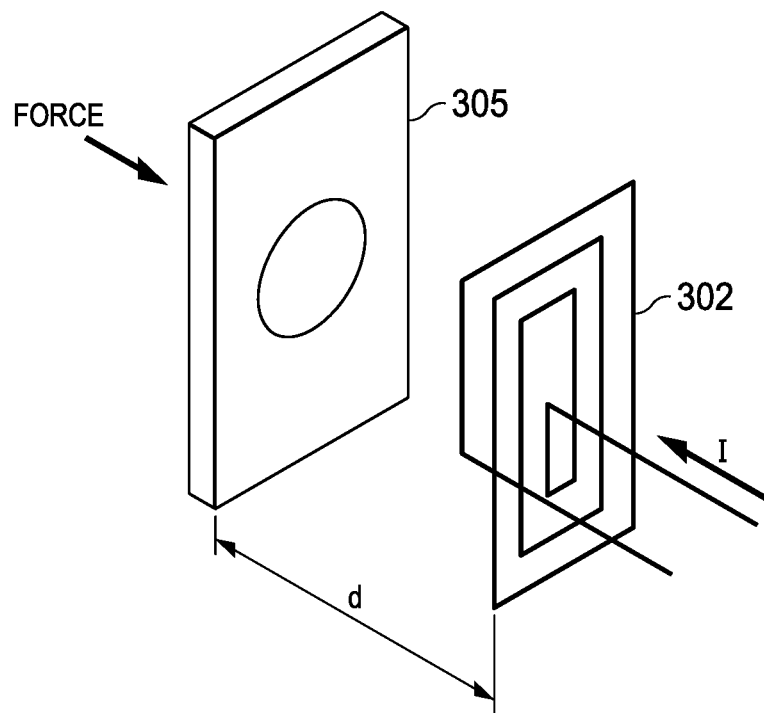
FIG. 3A illustrates a mechanical member separated by a distance from an inductive coil, in accordance with embodiments of the present disclosure.

FIG. 3A illustrates a mechanical member 305 embodied as a metal plate separated by a distance d from an inductive coil 302, in accordance with embodiments of the present disclosure. Mechanical member 305 may comprise any suitable system, device, or apparatus which all or a portion thereof may displace, wherein such displacement affects an electrical property (e.g., inductance, capacitance, etc.) of the mechanical member 305 or another electrical component in electrical communication (e.g., via a mutual inductance) with mechanical member 305.

Figure 3B:
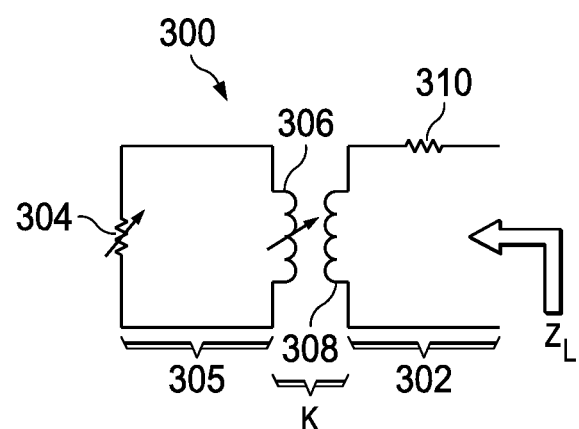
FIG. 3B illustrates selected components of an inductive sensing system that may be implemented by a resonant phase sensing system, in accordance with embodiments of the present disclosure.

FIG. 3B illustrates selected components of an inductive sensing system 300 that may be implemented by force sensor 105 and/or resonant phase sensing system 113, in accordance with embodiments of the present disclosure. As shown in FIG. 3, inductive sensing system 300 may include mechanical member 305, modeled as a variable electrical resistance 304 and a variable electrical inductance 306, and may include inductive coil 302 in physical proximity to mechanical member 305 such that inductive coil 302 has a mutual inductance with mechanical member 305 defined by a variable coupling coefficient k. As shown in FIG. 3, inductive coil 302 may be modeled as a variable electrical inductance 308 and a variable electrical resistance 310.

In operation, as a current I flows through inductive coil 302, such current may induce a magnetic field which in turn may induce an eddy current inside mechanical member 305. When a force is applied to and/or removed from mechanical member 305, which alters distance d between mechanical member 305 and inductive coil 302, the coupling coefficient k, variable electrical resistance 304, and/or variable electrical inductance 306 may also change in response to the change in distance. These changes in the various electrical parameters may, in turn, modify an effective impedance $Z_L$ of inductive coil 302.

Figure 4:
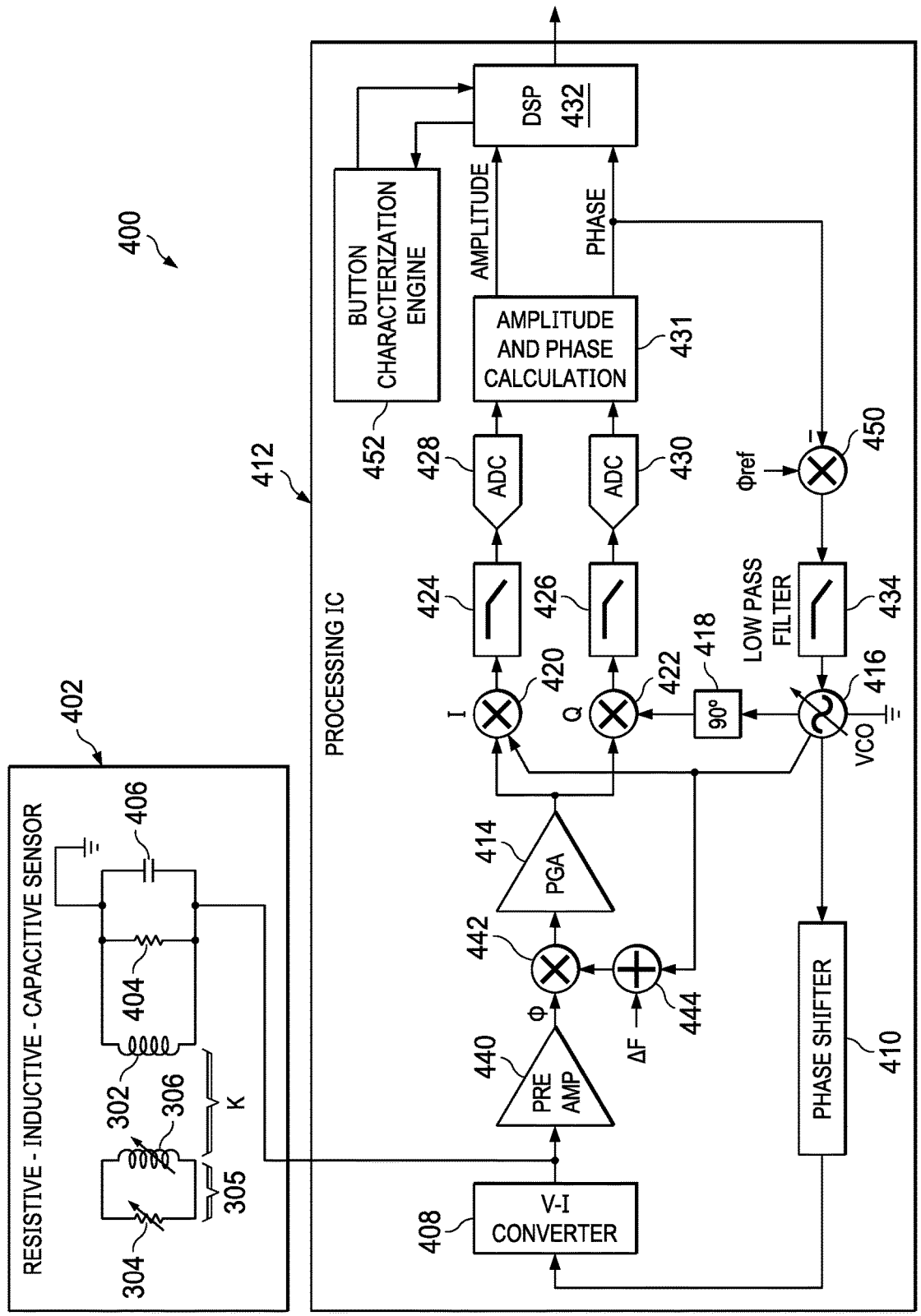
FIG. 4 illustrates a diagram of selected components of an example system for performing resonant phase sensing, in accordance with embodiments of the present disclosure.

FIG. 4 illustrates a diagram of selected components of an example system 400 for performing resonant phase sensing, in accordance with embodiments of the present disclosure. In some embodiments, system 400 may be used to implement resonant phase sensing system 113 of FIG. 1. As shown FIG. 4, system 400 may include a resistive-inductive-capacitive sensor 402 and a processing integrated circuit (IC) 412. In some embodiments, resistive-inductive-capacitive sensor 402 may implement all or a portion of force sensor 105 and processing integrated circuit (IC) 412 may implement all or a portion of resonant phase sensing system 113.

As shown in FIG. 4, resistive-inductive-capacitive sensor 402 may include mechanical member 305, inductive coil 302, a resistor 404, and capacitor 406, wherein mechanical member 305 and inductive coil 302 have a variable coupling coefficient k. Although shown in FIG. 4 to be arranged in parallel with one another, it is understood that inductive coil 302, resistor 404, and capacitor 406 may be arranged in any other suitable manner that allows resistive-inductive-capacitive sensor 402 to act as a resonant tank. For example, in some embodiments, inductive coil 302, resistor 404, and capacitor 406 may be arranged in series with one another. In some embodiments, resistor 404 may not be implemented with a stand-alone resistor, but may instead be implemented by a parasitic resistance of inductive coil 302, a parasitic resistance of capacitor 406, and/or any other suitable parasitic resistance.

Processing IC 412 may be communicatively coupled to resistive-inductive-capacitive sensor 402 and may comprise any suitable system, device, or apparatus configured to implement a measurement circuit to measure phase information associated with resistive-inductive-capacitive sensor 402 and based on the phase information, determine a displacement of mechanical member 305 relative to resistive-inductive-capacitive sensor 402. Thus, processing IC 412 may be configured to determine an occurrence of a physical interaction (e.g., press or release of a virtual button) associated with a human-machine interface associated with mechanical member 305 based on the phase information.

As shown in FIG. 4, processing IC 412 may include a phase shifter 410, a voltage-to-current converter 408, a preamplifier 440, an intermediate frequency mixer 442, a combiner 444, a programmable gain amplifier (PGA) 414, a voltage-controlled oscillator (VCO) 416, a phase shifter 418, an amplitude and phase calculation block 431, a DSP 432, a low-pass filter 434, a combiner 450, and a button characterization engine 452. Processing IC 412 may also include a coherent incident/quadrature detector implemented with an incident channel comprising a mixer 420, a low-pass filter 424, and an analog-to-digital converter (ADC) 428, and a quadrature channel comprising a mixer 422, a low-pass filter 426, and an ADC 430 such that processing IC 412 is configured to measure the phase information using the coherent incident/quadrature detector.

Phase shifter 410 may include any system, device, or apparatus configured to detect an oscillation signal generated by processing IC 412 (as explained in greater detail below) and phase shift such oscillation signal (e.g., by 45 degrees) such that a normal operating frequency of system 400, an incident component of a sensor signal $\phi$ generated by pre-amplifier 440 is approximately equal to a quadrature component of sensor signal $\phi$, so as to provide common mode noise rejection by a phase detector implemented by processing IC 412, as described in greater detail below.

Voltage-to-current converter 408 may receive the phase shifted oscillation signal from phase shifter 410, which may be a voltage signal, convert the voltage signal to a corresponding current signal, and drive the current signal on resistive-inductive-capacitive sensor 402 at a driving frequency with the phase-shifted oscillation signal in order to generate sensor signal $\phi$ which may be processed by processing IC 412, as described in greater detail below. In some embodiments, a driving frequency of the phase-shifted oscillation signal may be selected based on a resonant frequency of resistive-inductive-capacitive sensor 402 (e.g., may be approximately equal to the resonant frequency of resistive-inductive-capacitive sensor 402).

Preamplifier 440 may receive sensor signal $\phi$ and condition sensor signal $\phi$ for frequency mixing, with mixer 442, to an intermediate frequency $\Delta f$ combined by combiner 444 with an oscillation frequency generated by VCO 416, as described in greater detail below, wherein intermediate frequency $\Delta f$ is significantly less than the oscillation frequency. In some embodiments, preamplifier 440, mixer 442, and combiner 444 may not be present, in which case PGA 414 may receive sensor signal $\phi$ directly from resistive-inductive-capacitive sensor 402. However, when present, preamplifier 440, mixer 442, and combiner 444 may allow for mixing sensor signal $\phi$ down to a lower intermediate frequency Δf which may allow for lower-bandwidth and more efficient ADCs (e.g., ADCs 428 and 430 of FIGS. 4A and 4B and ADC 429 of FIG. 4C, described below) and/or which may allow for minimization of phase and/or gain mismatches in the incident and quadrature paths of the phase detector of processing IC 412.

In operation, PGA 414 may further amplify sensor signal ϕ to condition sensor signal ϕ for processing by the coherent incident/quadrature detector. VCO 416 may generate an oscillation signal to be used as a basis for the signal driven by voltage-to-current converter 408, as well as the oscillation signals used by mixers 420 and 422 to extract incident and quadrature components of amplified sensor signal ϕ. As shown in FIG. 4, mixer 420 of the incident channel may use an unshifted version of the oscillation signal generated by VCO 416, while mixer 422 of the quadrature channel may use a 90-degree shifted version of the oscillation signal phase shifted by phase shifter 418. As mentioned above, the oscillation frequency of the oscillation signal generated by VCO 416 may be selected based on a resonant frequency of resistive-inductive-capacitive sensor 402 (e.g., may be approximately equal to the resonant frequency of resistive-inductive-capacitive sensor 402).

In the incident channel, mixer 420 may extract the incident component of amplified sensor signal ϕ, low-pass filter 424 may filter out the oscillation signal mixed with the amplified sensor signal ϕ to generate a direct current (DC) incident component, and ADC 428 may convert such DC incident component into an equivalent incident component digital signal for processing by amplitude and phase calculation block 431. Similarly, in the quadrature channel, mixer 422 may extract the quadrature component of amplified sensor signal ϕ, low-pass filter 426 may filter out the phase-shifted oscillation signal mixed with the amplified sensor signal ϕ to generate a direct current (DC) quadrature component, and ADC 430 may convert such DC quadrature component into an equivalent quadrature component digital signal for processing by amplitude and phase calculation block 431.

Amplitude and phase calculation block 431 may include any system, device, or apparatus configured to receive phase information comprising the incident component digital signal and the quadrature component digital signal and based thereon, extract amplitude and phase information.

DSP 432 may include any system, device, or apparatus configured to interpret and/or execute program instructions and/or process data. In particular, DSP 432 may receive the phase information and the amplitude information generated by amplitude and phase calculation block 431 and based thereon, determine a displacement of mechanical member 305 relative to resistive-inductive-capacitive sensor 402, which may be indicative of an occurrence of a physical interaction (e.g., press or release of a virtual button or other interaction with a virtual interface) associated with a human-machine interface associated with mechanical member 305 based on the phase information. DSP 432 may also generate an output signal indicative of the displacement. In some embodiments, such output signal may comprise a control signal for controlling mechanical vibration of linear resonant actuator 107 in response to the displacement.

The phase information generated by amplitude and phase calculation block 431 may be subtracted from a reference phase $\phi_{ref}$ by combiner 450 in order to generate an error signal that may be received by low-pass filter 434. Low-pass filter 434 may low-pass filter the error signal, and such filtered error signal may be applied to VCO 416 to modify the frequency of the oscillation signal generated by VCO 416, in order to drive sensor signal ϕ towards reference phase $\phi_{ref}$. As a result, sensor signal ϕ may comprise a transient decaying signal in response to a "press" of a virtual button (or other interaction with a virtual interface) associated with system 400 as well as another transient decaying signal in response to a subsequent "release" of the virtual button (or other interaction with a virtual interface). Accordingly, low-pass filter 434 in connection with VCO 416 may implement a feedback control loop that may track changes in operating parameters of system 400 by modifying the driving frequency of VCO 416.

Button characterization engine 452 may comprise any system, device, or apparatus configured to apply one or more behavior models to received force sensor information, in order to discriminate between valid user interactions with force sensor 105/mechanical member 305 and anomalous force sensor 105/mechanical member 305 inputs, such as those caused by drift of physical parameters of force sensor 105, mechanical member 305, resonant phase sensing system 113, etc., and/or due to atypical forces upon mobile device 102 such as bending or twisting. Although FIG. 4 depicts that, in some embodiments, button characterization engine 452 is external to DSP 432, in some embodiments, functionality of button characterization engine 452 may be implemented in whole or part by DSP 432.

Although the foregoing contemplates use of closed-loop feedback for sensing of displacement, the various embodiments represented by FIG. 4 may be modified to implement an open-loop system for sensing of displacement. In such an open-loop system, a processing IC may include no feedback path from amplitude and phase calculation block 431 to VCO 416 or variable phase shifter 418 and thus may also lack a feedback low-pass filter 434. Thus, a phase measurement may still be made by comparing a change in phase to a reference phase value, but the oscillation frequency driven by VCO 416 may not be modified or the phase shifted by variable phase shifter 418 may not be shifted.

Although the foregoing contemplates use of a coherent incident/quadrature detector as a phase detector for determining phase information associated with resistive-inductive-capacitive sensor 402, a resonant phase sensing system 112 may perform phase detection and/or otherwise determine phase information associated with resistive-inductive-capacitive sensor 402 in any suitable manner, including, without limitation, using only one of the incident path or quadrature path to determine phase information.

In some embodiments, an incident/quadrature detector as disclosed herein may include one or more frequency translation stages that translate the sensor signal into direct-current signal directly or into an intermediate frequency signal and then into a direct-current signal. Any of such frequency translation stages may be implemented either digitally after an analog-to-digital converter stage or in analog before an analog-to-digital converter stage.

In addition, although the foregoing contemplates measuring changes in resistance and inductance in resistive-inductive-capacitive sensor 402 caused by displacement of mechanical member 305, other embodiments may operate based on a principle that any change in impedance based on displacement of mechanical member 305 may be used to sense displacement. For example, in some embodiments, displacement of mechanical member 305 may cause a change in a capacitance of resistive-inductive-capacitive sensor 402, such as if mechanical member 305 included a metal plate implementing one of the capacitive plates of capacitor 406.

Although DSP 432 may be capable of processing phase information to make a binary determination of whether physical interaction associated with a human-machine interface associated with mechanical member 305 has occurred and/or ceased to occur, in some embodiments, DSP 432 may quantify a duration of a displacement of mechanical member 305 to more than one detection threshold, for example to detect different types of physical interactions (e.g., a short press of a virtual button versus a long press of the virtual button). In these and other embodiments, DSP 432 may quantify a magnitude of the displacement to more than one detection threshold, for example to detect different types of physical interactions (e.g., a light press of a virtual button versus a quick and hard press of the virtual button).

Although FIG. 4 and the description thereof depicts particular embodiments of a resonant phase sensing system, other architectures for force sensing may be used consistent with this disclosure, including without limitation the various resonant phase sensing system architectures described in U.S. patent application Ser. No. 16/267,079, filed Feb. 4, 2019. Thus, while button characterization engine 452 is discussed herein in relation to operation in connection with a resonant phase sensing system, button characterization engine 452 may be used with any other suitable force sensing system.

Figure 5:
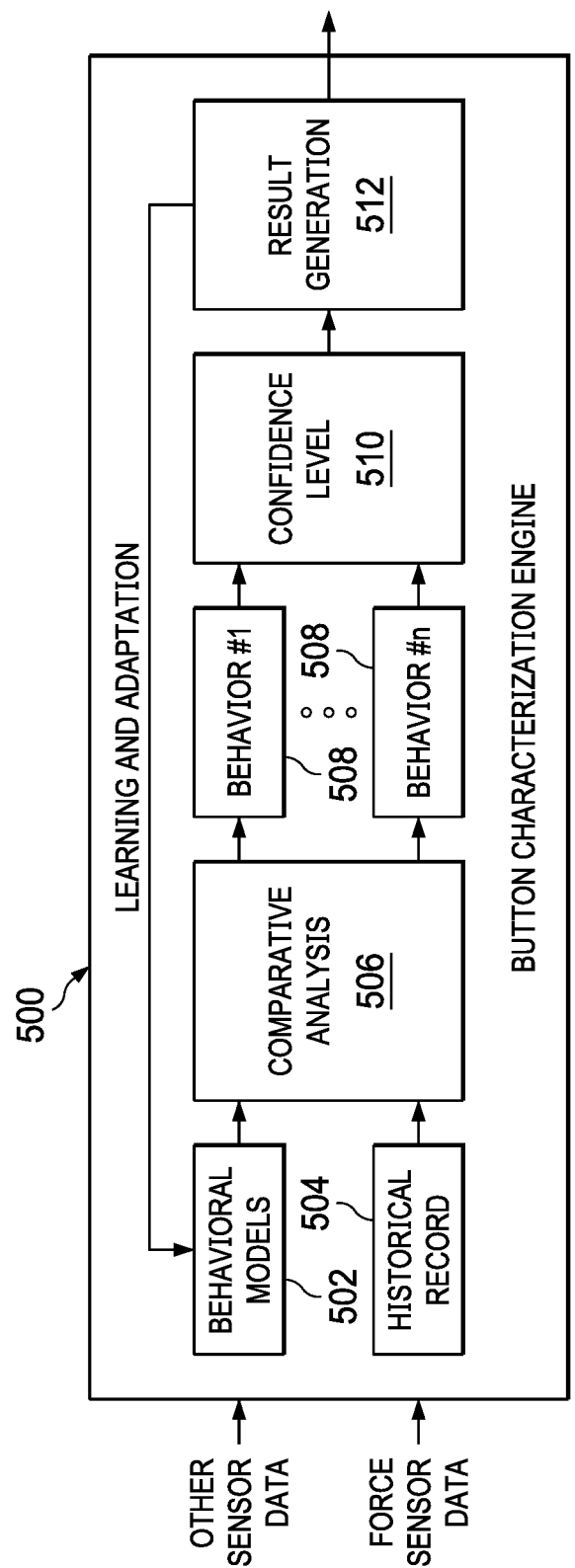
FIG. 5 illustrates a diagram of selected components of an example button characterization engine, in accordance with embodiments of the present disclosure.

FIG. 5 illustrates a diagram of selected components of an example button characterization engine 500, in accordance with embodiments of the present disclosure. In some embodiments, button characterization engine 500 as shown in FIG. 5 may implement all or a portion of button characterization engine 452 depicted in FIG. 4.

In operation, button characterization engine 500 may receive an input comprising force sensor data from a force sensing system indicative of a force applied to a virtual button. For example, in the resonance phase sensing system described above, the input may comprise a phase measurement. Button characterization engine 500 may compare the received input against one or more stored behavioral models 502, wherein each behavioral model 502 is indicative of actual valid user interactions with a virtual button, to determine if the received input is a valid user interaction.

In some embodiments, button characterization engine 500 may, using a comparative analysis module 506, compare the received force sensor data input against a historical record 504 of received input, and against at least one stored behavioral model 502. Based on such comparative analysis, button characterization engine 500 may generate a plurality of different behavior scores 508 providing an indication of the validity of the received input, each behavior score related to a different user behavior (e.g., different type of user touch event). The different scores may be used as input to a confidence level module 510, which may combine or fuse the different scores to generate an indication of the confidence that the received input is a valid input relating to an actual user interaction or not. Based on the confidence level, which may in some embodiments be compared to a relevant threshold, result generation module 512 of button characterization engine 500 may output an indication (e.g., to DSP 432 or other processing module) whether or not a valid user interaction with a virtual button has occurred. In addition, based on the confidence level, button characterization engine 500 may perform learning and/or adaptation, in order to update or enrich at least one of the stored behavioral models 502, to provide an improved model of user interaction with a virtual button or device comprising the virtual button.

To further illustrate, confidence level module 510 may calculate a confidence score (e.g., score of 100 indicative of certain intentional user interaction; score of 0 indicative of certain user non-interaction), based on historical record 504, behavioral models 502, and/or other factors (e.g., gradient of user interaction, as described with reference to FIGS. 10 and 11, below).

As shown in FIG. 5, in some embodiments, button characterization engine 500 may receive input from other sensors of a device other than force sensor data of the virtual button, which may be used in selection of behavioral models 502 and/or comparative analysis. In some of such embodiments, the input from other sensors may include data regarding user interaction with other mechanical buttons and/or virtual buttons of the device.

Example functionality of button characterization engine 500 may be described in FIGS. 6 through 11, below.

Figure 6:
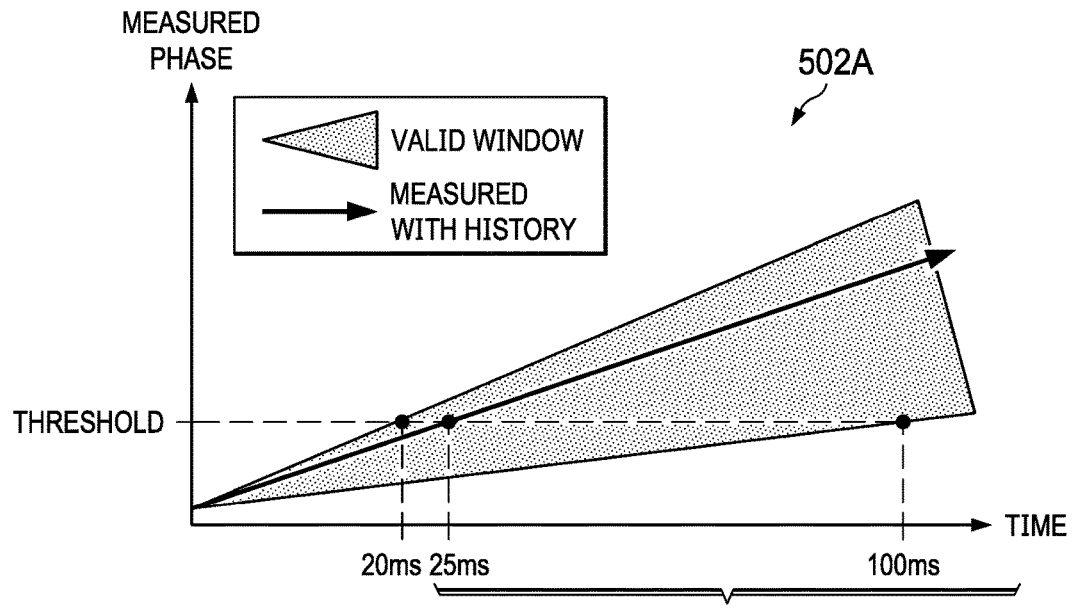
FIG. 6 illustrates a behavioral model represented by graph of phase versus time depicting a measured phase input signal being compared against a model of a window of valid phases for a user interaction event with a virtual button over time, in accordance with embodiments of the present disclosure.

FIG. 6 illustrates a behavioral model 502A represented by graph of phase versus time depicting a measured phase input signal being compared against a model of a window of valid phases for a user interaction event with a virtual button over time, in accordance with embodiments of the present disclosure. In behavioral model 502A, a window of between 20 and 100 milliseconds may be defined for a force sensor data input signal to reach a measured phase threshold for a valid user interaction. Thus, if the force sensor data input signal reaches such a level within the defined window of time, button characterization engine 500 may determine that a valid user interaction event has occurred, and in response output an appropriate signal or flag (e.g., to DSP 432 or other processing module) indicative of the occurrence of a valid user interaction event. An initial algorithm may specify a relatively large valid time window around a button press to accommodate a large variety of users and press preferences.

As described above, button characterization engine 500 may be configured to adaptively update one or more behavioral models 502 over time, based on, among other things, a history of valid user interaction events. For example, if user interaction events generally follow the line shown in FIG. 6, button characterization engine 500 may update stored behavior model 502A to better accommodate such user interactions.

In some embodiments, behavioral models 502 may be created on a per-user basis to track usage history for a plurality of users. For example, user identity may be determined based on a user's login credential information (e.g., biometric recognition, passcode, etc.) and historical record 504 and behavioral models 502 may be created for each particular user of a device, to individually tailor user interaction determination to each individual user.

Figure 7:
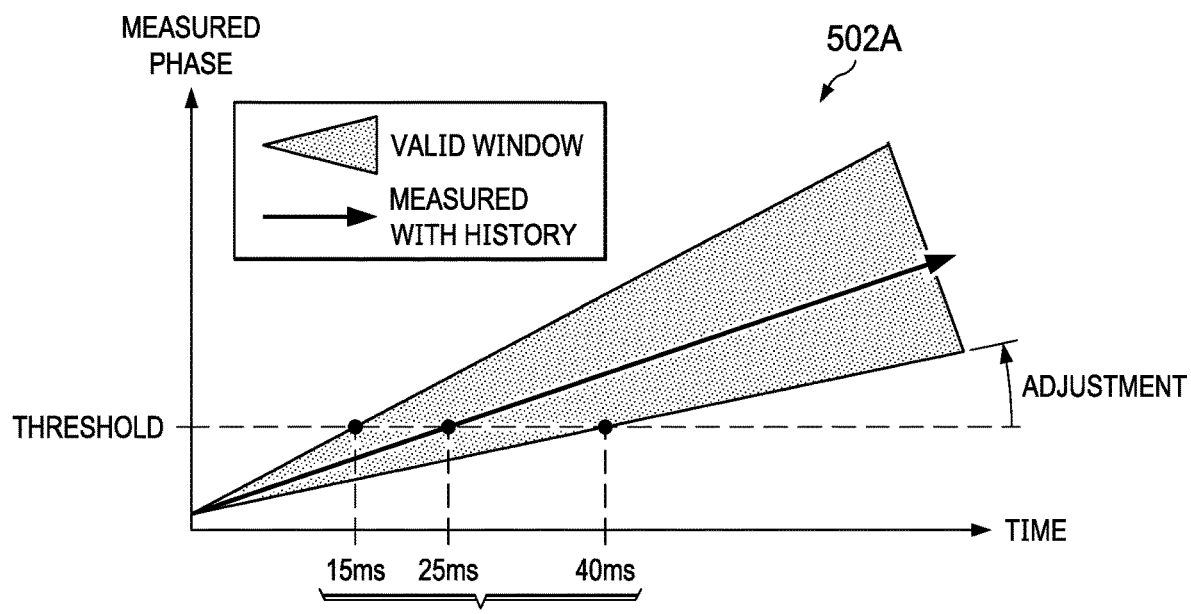
FIG. 7 illustrates updating of the behavioral model shown in FIG. 6, in accordance with embodiments of the present disclosure.

For example, FIG. 7 illustrates updating of behavioral model 502A shown in FIG. 6, in accordance with embodiments of the present disclosure. As shown in FIG. 7, button characterization engine 500 may update behavioral model 502A to re-center the valid window of user interactions based on historical user interaction. In the particular example of FIG. 7, the valid window is updated to be defined by a window of between 15 and 40 milliseconds, which may provide a more accurate representation of a particular user's interaction with a device. Thus, button characterization engine 500 may effectively learn a user's virtual button interaction speed over time, and modify the valid window of behavioral model 502A in order to improve the button press detection margin and user experience.

Another example behavioral model 502 may be based at least in part on a derivative with respect to time of a force sensor data input signal. To that end, FIG. 8 illustrates a graph of a measured phase versus time and a behavioral model 502B, depicting a time derivative of a measured phase input signal for a valid user interaction being compared against a model of a window of valid rates of change of phases for a user interaction event with a virtual button over time, in accordance with embodiments of the present disclosure.

Figure 8:
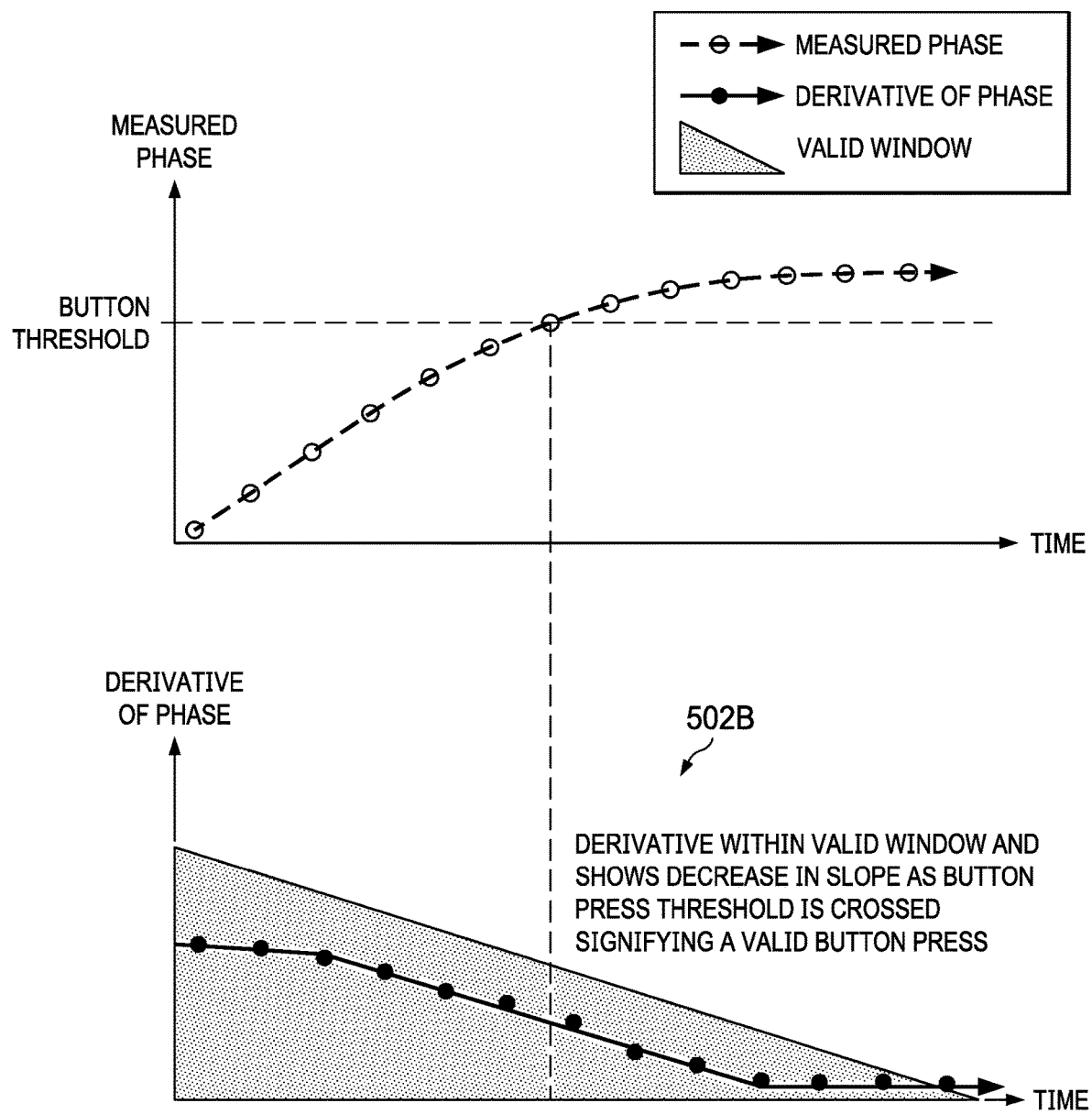
FIG. 8 illustrates a graph of a measured phase versus time and a behavioral model depicting a time derivative of a measured phase input signal for a valid user interaction being compared against a model of a window of valid rates of change of phases for a user interaction event with a virtual button over time, in accordance with embodiments of the present disclosure.

In the upper plot of FIG. 8, phase characteristics of an example user interaction with a virtual button may be illustrated, wherein a measured phase input signal exceeds a threshold indicative of a valid user interaction. The lower plot of FIG. 8 depicts a time derivative of such measured phase input signal, showing that a typical user interaction with a virtual button may decrease over time, allowing the time derivative of the input signal to be compared with an appropriate validity window of behavioral model 502B.

Figure 9:
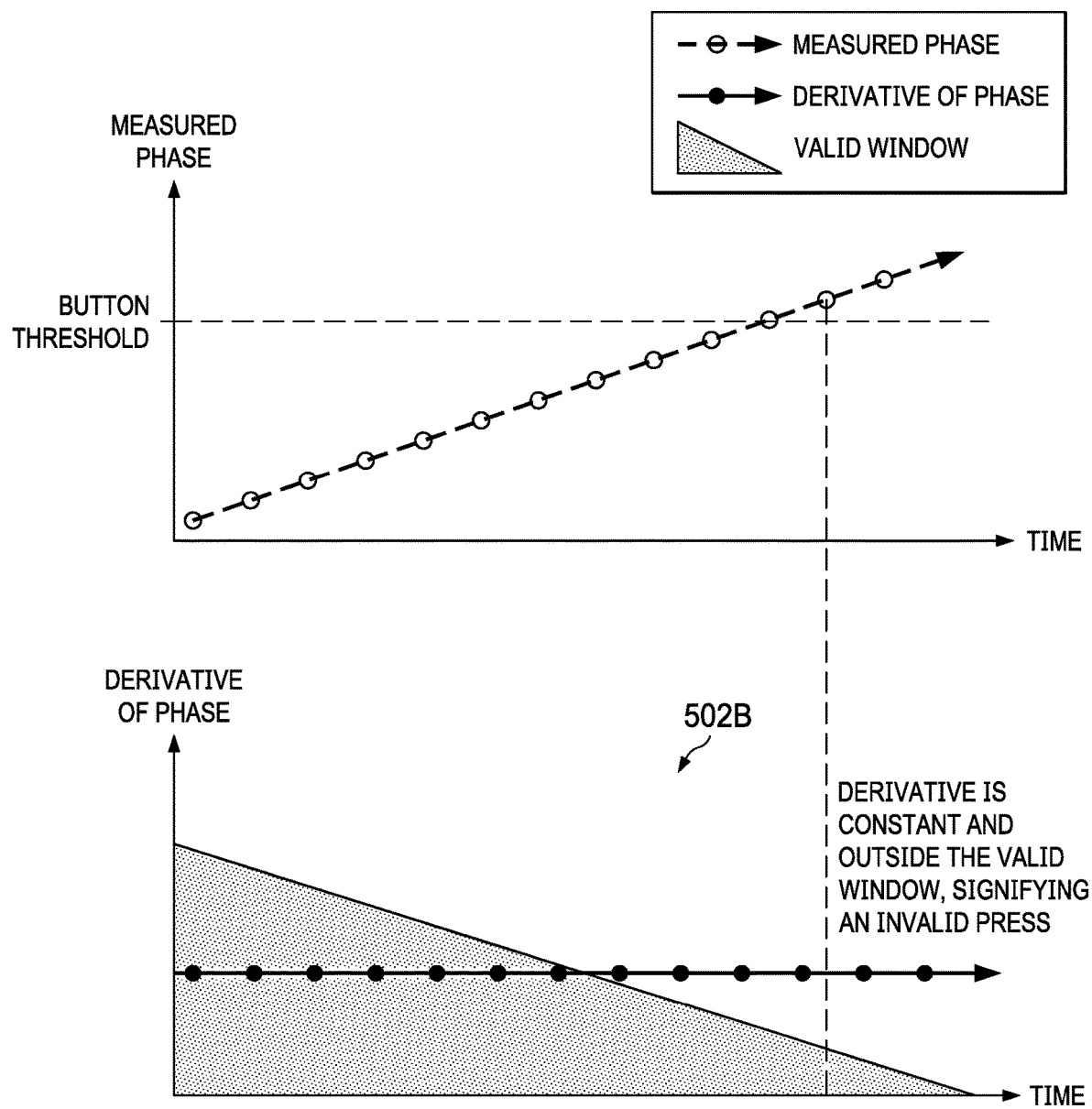
FIG. 9 illustrates a graph of a measured phase versus time and a behavioral model depicting a time derivative of a measured phase input signal for an invalid user interaction being compared against a model of a window of valid rates of change of phases for a user interaction event with a virtual button over time, in accordance with embodiments of the present disclosure.

By contrast, FIG. 9 illustrates a graph of a measured phase versus time and behavioral model 502B, depicting a time derivative of a measured phase input signal for an invalid user interaction (e.g., as may occur as a result of sensor drift) being compared against a model of a window of valid rates of change of phases for a user interaction event with a virtual button over time, in accordance with embodiments of the present disclosure. In FIG. 9, while the measured phase input signal meets a relevant threshold, the time derivative of the measured phase input signal may be a constant value, and as a result can be easily seen to extend outside of the validity window of behavioral model 502B, thereby allowing button characterization engine 500 to determine that an invalid user interaction has occurred.

In these and other embodiments, button characterization engine 500 may be able to calculate any other function of an input force sensor data signal (e.g., a higher order derivative), and compare calculated values related to such function against an allowable validity window for that function.

In these and other embodiments, button characterization engine 500 may be configured to compare received force sensor data input against one or more behavioral models 502 relating to a consistency of the applied force. To illustrate, human pressure to a virtual button may not be applied with a steady force. In general, a standard deviation in a time derivative of a response due to human force may be both non-uniform and varied compared to one or more characteristic environmental factors (e.g., temperature effects).

Figure 10:
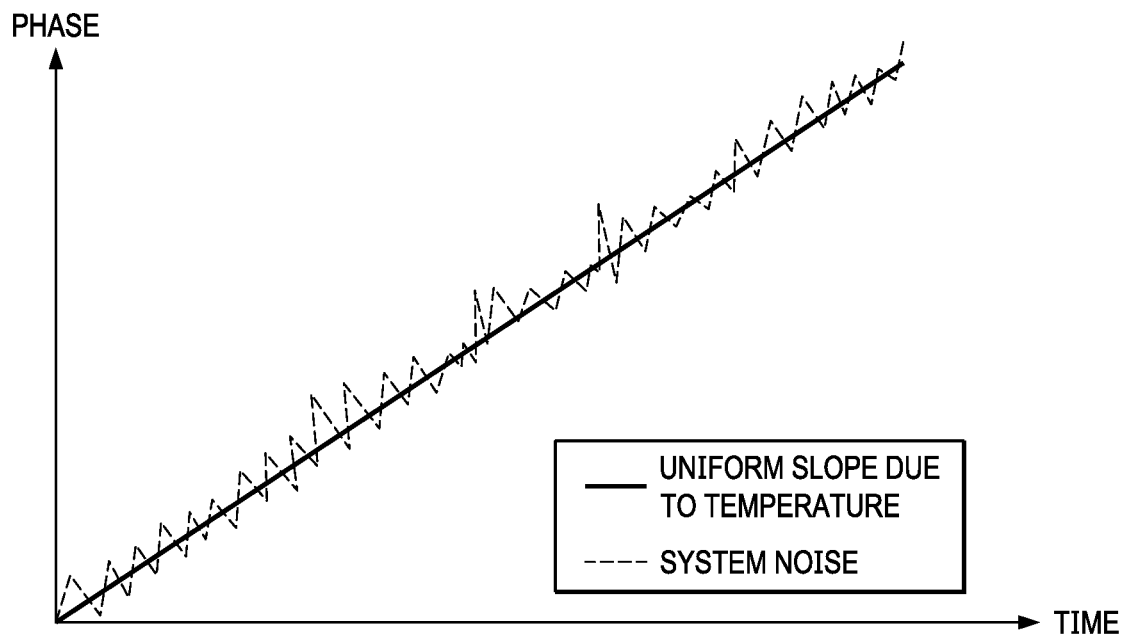
FIG. 10 illustrates an example measured phase input signal that may result due to temperature effects, in accordance with embodiments of the present disclosure.

For example, FIG. 10 depicts an example measured phase input signal that may result due to temperature effects, in accordance with embodiments of the present disclosure. As shown in FIG. 10, when accounting for system noise, the example measured phase input signal may have a uniform slope due to temperature effects on a force sensing system.

Figure 11:
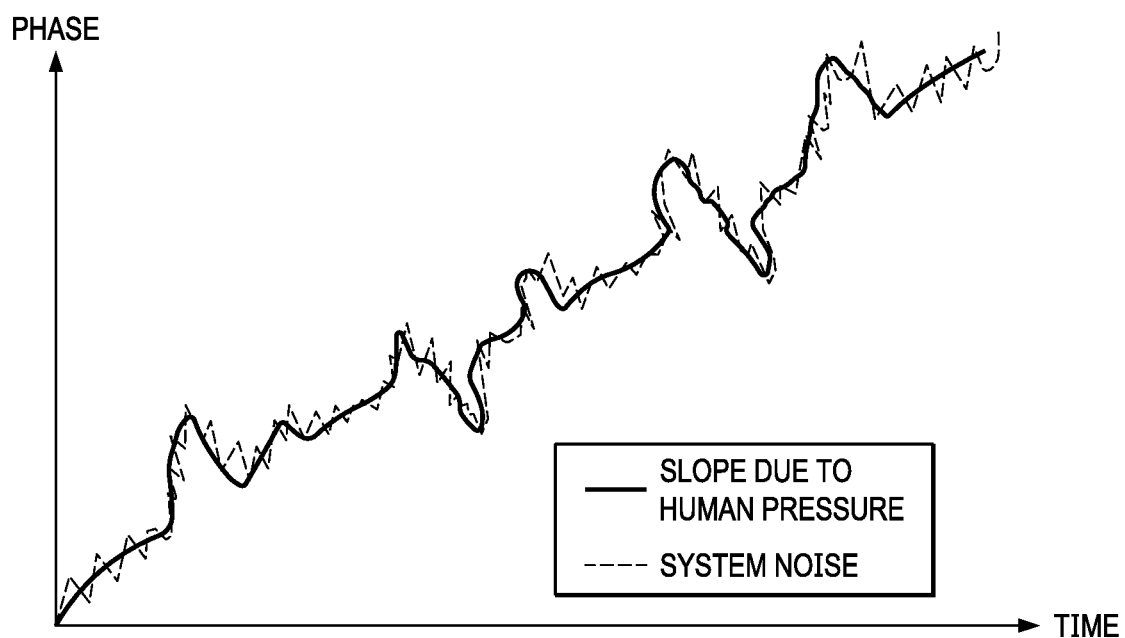
FIG. 11 illustrates an example measured phase input signal that may result due to human interaction, in accordance with embodiments of the present disclosure.

On the other hand, FIG. 11 depicts an example measured phase input signal that may result due to human interaction, in accordance with embodiments of the present disclosure. As shown in FIG. 11, the example measured phase input signal may have a slope with a non-uniform gradient in response to a valid user interaction with a virtual button.

Notably, when comparing FIGS. 10 and 11, while both measured phase input signals shown in these figures have a similar phase difference over time, button characterization engine 500 may differentiate valid human interaction from temperature and/or other environmental effects based on characteristic differences between the signals, such as the variance of slope over time. In some embodiments, button characterization engine 500 may use historical user interaction as embodied in behavioral models 502 (e.g., historical non-uniform effects related to a user) to differentiate valid human interaction from temperature and/or other environmental effects.

In addition to the various behaviors described above, button characterization engine 500 may use other behaviors, and associated behavioral models 502, to discriminate between valid and invalid user interaction events. For example, left-handed use versus right-handed use of a device with a virtual button may produce different measured responses across multiple sensors of a device. Indicia of handedness of a user may be used by button characterization engine 500 to enhance button detection and improve false reject rates. Similarly, use of different fingers (e.g., thumb versus other fingers) may also produce different sensor responses, which may also be used by button characterization engine 500 to enhance button detection.

As another example, button characterization engine 500 may use a measured phase relationship of a virtual button to other sensors to enhance button detection. For example, typical ambient conditions of a user or a device location may result in a measurable phase shift in addition to the desired phase response of a user interaction with a virtual button. Button characterization engine 500 may characterize and learn such information when compared to other sensor data. Examples of other sensors whose data may be used in conjunction with phase data may include adjacent sensor channels, temperature detected by a temperature sensor, gyroscopic forces from a gyroscopic sensor or accelerometer, capacitive sensors, and/or other sensors.

As a further example, a user may perform application-specific events with a specific rate, force, and time interval, such as a double click event. Button characterization engine 500 may detect a user's preferences related to application-specific events and update the detection criteria for enhanced user experience and/or latency for detection. Examples of application specific events may include: a single press, a double press, a long press, a multi-channel press, a force dependent threshold, a slide operation, etc.

Advantages of the systems and methods described herein are that history and behavioral models regarding a user's interaction with a device may be used to decrease a time needed to determine valid user interactions, thus potentially reducing latencies between user interactions and determination of the user interactions, thus potentially increasing user experience.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising:
receiving an input signal from a force sensor configured to sense a force associated with a human interaction with a virtual button;
comparing the input signal to at least one behavioral model, the at least one behavioral model comprising one or more parameters associated with a valid human interaction with the virtual button and the one or more parameters comprising a defined validity window defining a range of input signal magnitude against time for determining the valid human interaction occurred; and
determining whether a valid human interaction with the virtual button occurred based on the comparing.

2. The method of claim 1, further comprising adaptively updating the at least one behavioral model over time based on historical human interaction with the virtual button.

3. The method of claim 1, further comprising:
determining a handedness of a user interacting with the virtual button; and
selecting the at least one behavioral model for comparison based on the handedness of the user.

4. The method of claim 1, further comprising:
determining a finger of a user interacting with the virtual button; and
selecting the at least one behavioral model for comparison based on the finger.

5. The method of claim 1, further comprising:
receiving at least one other sensor input signal other than the input signal; and
determining whether a valid human interaction with the virtual button occurred based on the comparing and the at least one other sensor input signal.

6. The method of claim 1, further comprising:
receiving an indication of an application-specific event associated with a human interaction with the virtual button; and
comparing the input signal to at least one behavioral model based on at least the application-specific event.

7. The method of claim 1, wherein the force sensor comprises one of a capacitive displacement sensor, an inductive force sensor, a resistive-inductive-capacitive sensor, a strain gauge, a piezoelectric force sensor, force sensing resistor, piezoelectric force sensor, thin film force sensor, or a quantum tunneling composite-based force sensor.

8. The method of claim 1, further comprising:
maintaining at least one behavioral model unique to each of a plurality of users;
identifying a user interacting with the virtual button; and
determining whether a valid human interaction with the virtual button occurred based on the comparing and an identify of the user.

9. A method comprising:
receiving an input signal from a force sensor configured to sense a force associated with a human interaction with a virtual button;
comparing the input signal to at least one behavioral model, the at least one behavioral model comprising one or more parameters associated with a valid human interaction with the virtual button;
calculating a function of the input signal, wherein the one or more parameters comprise a defined validity window defining a range of a magnitude of the function against time for determining the valid human interaction occurred; and
determining whether a valid human interaction with the virtual button occurred based on the comparing.

10. The method of claim 9, wherein the function is a derivative with respect to time of the input signal.

11. A method comprising:
receiving an input signal from a force sensor configured to sense a force associated with a human interaction with a virtual button;
comparing the input signal to at least one behavioral model, the at least one behavioral model comprising one or more parameters associated with a valid human interaction with the virtual button;
calculating a measurement of a slope of the input signal over a time period; and
determining whether a valid human interaction with the virtual button occurred based on the comparing and on a gradient of the slope over the time period.

12. The method of claim 11, further comprising determining that the valid human interaction occurred if the gradient is non-uniform over the time period.

13. The method of claim 11, further comprising determining a presence of an environmental change of the force sensor if the gradient is uniform over the time period.

14. The method of claim 11, further comprising determining that the valid human interaction occurred if the gradient is consistent with historical gradients related to valid human interaction with the virtual button.

15. The method of claim 11, further comprising calculating a confidence score indicative of a likelihood of valid human interaction based on the comparing of the at least one behavioral model with the input signal and the gradient of the slope over the time period.

16. A system comprising:
an input for receiving an input signal from a force sensor configured to sense a force associated with a human interaction with a virtual button; and
a button characterization engine configured to:
compare the input signal to at least one behavioral model, the at least one behavioral model comprising one or more parameters associated with a valid human interaction with the virtual button and the one or more parameters comprising a defined validity window defining a range of input signal magnitude against time for determining the valid human interaction occurred; and
determine whether a valid human interaction with the virtual button occurred based on the comparing.

17. The system of claim 16, wherein the button characterization engine is further configured to adaptively update the at least one behavioral model over time based on historical human interaction with the virtual button.

18. The system of claim 16, wherein the button characterization engine is further configured to:
determine a handedness of a user interacting with the virtual button; and
select the at least one behavioral model for comparison based on the handedness of the user.

19. The system of claim 16, wherein the button characterization engine is further configured to:
determine a finger of a user interacting with the virtual button; and
select the at least one behavioral model for comparison based on the finger.

20. The system of claim 16, wherein the button characterization engine is further configured to:
receive at least one other sensor input signal other than the input signal; and
determine whether a valid human interaction with the virtual button occurred based on the comparing and the at least one other sensor input signal.

21. The system of claim 16, wherein the button characterization engine is further configured to:
receive an indication of an application-specific event associated with a human interaction with the virtual button; and
compare the input signal to at least one behavioral model based on at least the application-specific event.

22. The system of claim 16, wherein the force sensor comprises one of a capacitive displacement sensor, an inductive force sensor, a resistive-inductive-capacitive sensor, a strain gauge, a piezoelectric force sensor, force sensing resistor, piezoelectric force sensor, thin film force sensor, or a quantum tunneling composite-based force sensor.

23. The system of claim 16, wherein the button characterization engine is further configured to:
maintain at least one behavioral model unique to each of a plurality of users;
identify a user interacting with the virtual button; and
determine whether a valid human interaction with the virtual button occurred based on the comparing and an identify of the user.

24. A system comprising:
an input for receiving an input signal from a force sensor configured to sense a force associated with a human interaction with a virtual button; and
a button characterization engine configured to:
compare the input signal to at least one behavioral model, the at least one behavioral model comprising one or more parameters associated with a valid human interaction with the virtual button;
calculate a function of the input signal, wherein the one or more parameters comprise a defined validity window defining a range of a magnitude of the function against time for determining the valid human interaction occurred; and
determine whether a valid human interaction with the virtual button occurred based on the comparing.

25. The system of claim 24, wherein the function is a derivative with respect to time of the input signal.

26. A system comprising:
an input for receiving an input signal from a force sensor configured to sense a force associated with a human interaction with a virtual button; and
a button characterization engine configured to:
compare the input signal to at least one behavioral model, the at least one behavioral model comprising one or more parameters associated with a valid human interaction with the virtual button;
determine whether a valid human interaction with the virtual button occurred based on the comparing;
calculate a measurement of a slope of the input signal over a time period; and
determine whether a valid human interaction with the virtual button occurred based on the comparing and on a gradient of the slope over the time period.

27. The system of claim 26, wherein the button characterization engine is further configured to determine that the valid human interaction occurred if the gradient is non-uniform over the time period.

28. The system of claim 26, wherein the button characterization engine is further configured to determine a presence of an environmental change of the force sensor if the gradient is uniform over the time period.

29. The system of claim 26, wherein the button characterization engine is further configured to determine that the valid human interaction occurred if the gradient is consistent with historical gradients related to valid human interaction with the virtual button.

30. The system of claim 26, wherein the button characterization engine is further configured to calculate a confidence score indicative of a likelihood of valid human interaction based on the comparing of the at least one behavioral model with the input signal and the gradient of the slope over the time period.

* * * * *